(12) United States Patent
Schönfeld et al.

(10) Patent No.: US 12,492,952 B2
(45) Date of Patent: Dec. 9, 2025

(54) FORCE SENSORS FOR CRIMPING PLIERS AND CRIMPING PLIERS COMPRISING A FORCE SENSOR

(71) Applicant: WEZAG GmbH & Co. KG, Stadtallendorf (DE)

(72) Inventors: Lothar Schönfeld, Stadtallendorf (DE); Jan Lepa, Marburg (DE)

(73) Assignee: WEZAG GmbH & Co. KG, Stadtallendorf (DE)

( * ) Notice: Subject to any disclaimer, the term of this patent is extended or adjusted under 35 U.S.C. 154(b) by 287 days.

(21) Appl. No.: 18/118,167

(22) Filed: Mar. 7, 2023

(65) Prior Publication Data
US 2023/0314243 A1    Oct. 5, 2023

(30) Foreign Application Priority Data
Mar. 9, 2022 (EP) .................................... 22161157

(51) Int. Cl.
*G01L 1/16* (2006.01)
*H01R 43/042* (2006.01)

(52) U.S. Cl.
CPC .............. *G01L 1/16* (2013.01); *H01R 43/042* (2013.01)

(58) Field of Classification Search
CPC . G01L 1/16; G01L 5/009; G01L 5/167; G01L 5/0038; H01R 43/0486
See application file for complete search history.

(56) References Cited

U.S. PATENT DOCUMENTS

| | | |
|---|---|---|
| 4,794,780 A | 1/1989 | Battenfeld |
| 5,153,984 A | 10/1992 | Beetz |
| 5,187,968 A | 2/1993 | Beetz |
| 5,195,042 A | 3/1993 | Ferraro |
| 5,490,406 A | 2/1996 | College |
| 5,913,933 A | 6/1999 | Beetz |
| 6,026,671 A | 2/2000 | Battenfeld |
| 6,053,025 A | 4/2000 | Beetz |
| 6,073,472 A * | 6/2000 | Hollingsworth ... H01R 43/0486 29/751 |

(Continued)

FOREIGN PATENT DOCUMENTS

| | | |
|---|---|---|
| DE | 37 08 727 C2 | 7/1988 |
| DE | 40 14 221 A1 | 11/1990 |

(Continued)

OTHER PUBLICATIONS

Product catalogue "Werkzeuge für die professionelle Anwendung" (publication No. 10/11) of the Wezag GmbH Werkzeugfabrik company.

(Continued)

*Primary Examiner* — Tran M. Tran
(74) *Attorney, Agent, or Firm* — The Sladkus Law Group (57) ABSTRACT

The invention relates to a crimping pliers force sensor. The crimping pliers force sensor comprises a transfer body which is contacted by a die half and a supporting body. At least one piezoelectric film is arranged between the transfer body and the supporting body. The transfer body and the supporting body comprise protrusions and recesses. By the protrusions and recesses the transfer body is floatingly accommodated in the supporting body with the provision of a guidance in a transversal plane.

20 Claims, 9 Drawing Sheets

(56) References Cited

U.S. PATENT DOCUMENTS

| | | | |
|---|---|---|---|
| 6,155,095 | A | 12/2000 | Beetz |
| 6,966,230 | B2 * | 11/2005 | Frenken ............. B30B 15/0094 73/819 |
| 7,487,654 | B2 * | 2/2009 | Lefavour ................ B25B 27/10 72/21.6 |
| 7,793,571 | B2 | 9/2010 | Streuli |
| 8,156,823 | B2 * | 4/2012 | Kim ....................... G01L 5/167 73/862.041 |
| 8,230,715 | B2 * | 7/2012 | Battenfeld .......... H01R 43/042 72/413 |
| 8,601,856 | B2 * | 12/2013 | Battenfeld .......... H01R 43/042 72/461 |
| 8,887,582 | B2 * | 11/2014 | Suzuki ................... G01L 1/162 73/862.59 |
| 9,239,270 | B2 * | 1/2016 | Ting ......................... G01L 3/10 |
| 9,568,381 | B2 * | 2/2017 | Daniecki .................. A43D 1/00 |
| 9,829,397 | B2 * | 11/2017 | Lukens .................. H10N 30/88 |
| 9,864,948 | B2 * | 1/2018 | Glockseisen ............. B25B 7/00 |
| 9,923,346 | B2 * | 3/2018 | Zinser .................. H02G 1/1236 |
| 9,989,427 | B2 * | 6/2018 | Teshigawara ........... G01L 1/005 |
| 10,024,739 | B2 * | 7/2018 | Kawamura ............ H10N 30/88 |
| 10,175,126 | B2 * | 1/2019 | Araki ...................... G01L 1/225 |
| 10,245,738 | B2 * | 4/2019 | Zhang .................... B26B 13/22 |
| 10,513,015 | B2 * | 12/2019 | Lefavour ................ B25B 17/00 |
| 10,700,259 | B2 * | 6/2020 | Mori ................... H10N 30/857 |
| 10,859,458 | B2 * | 12/2020 | Asakura ............... H10N 30/302 |
| 10,862,258 | B2 * | 12/2020 | Battenfeld .......... H01R 43/058 |
| 10,958,030 | B2 * | 3/2021 | Glockseisen ......... G01L 5/0076 |
| 11,073,435 | B2 * | 7/2021 | Minami ................... G01L 1/16 |
| 11,289,866 | B2 * | 3/2022 | Kelly .................. H01R 43/0424 |
| 11,346,732 | B2 * | 5/2022 | Glockseisen ............. G01L 1/16 |
| 11,381,049 | B2 * | 7/2022 | Glockseisen ...... H01R 43/0421 |
| 11,566,954 | B2 * | 1/2023 | Lin ........................... G01L 1/16 |
| 12,199,395 | B2 * | 1/2025 | Riechmann ........ H01R 43/0486 |
| 2002/0056309 | A1 | 5/2002 | Beetz |
| 2003/0005586 | A1 | 1/2003 | Beetz |
| 2004/0055357 | A1 | 3/2004 | Beetz |
| 2008/0078255 | A1 | 4/2008 | Ngo |
| 2009/0044410 | A1 | 2/2009 | Battenfeld |
| 2009/0173133 | A1 | 7/2009 | Battenfeld |
| 2009/0217791 | A1 | 9/2009 | Battenfeld |
| 2011/0072593 | A1 | 3/2011 | Battenfeld |
| 2012/0144893 | A1 | 6/2012 | Battenfeld |
| 2014/0047885 | A1 | 2/2014 | Battenfeld |
| 2016/0111840 | A1 | 4/2016 | Battenfeld |
| 2016/0111841 | A1 | 4/2016 | Battenfeld |
| 2017/0239788 | A1 | 8/2017 | Battenfeld |
| 2018/0309256 | A1 | 10/2018 | Glockseisen |
| 2019/0301950 | A1 * | 10/2019 | Arai ......................... G01L 1/10 |
| 2019/0314966 | A1 | 10/2019 | Glockseisen |
| 2019/0363502 | A1 | 11/2019 | Glockseisen |
| 2020/0061785 | A1 | 2/2020 | Glockseisen |
| 2020/0161822 | A1 | 5/2020 | Glockseisen |
| 2021/0114840 | A1 | 4/2021 | Joyner |
| 2021/0140840 | A1 | 5/2021 | Glockseisen |
| 2024/0313489 | A1 * | 9/2024 | Glockseisen ............. B25B 7/12 |
| 2024/0313490 | A1 * | 9/2024 | Ohni .................. H01R 43/0486 |
| 2025/0180414 | A1 * | 6/2025 | Murozaki ................. G01L 1/16 |

FOREIGN PATENT DOCUMENTS

| | | |
|---|---|---|
| DE | 40 23 337 C1 | 10/1991 |
| DE | 40 39 435 C1 | 6/1992 |
| DE | 40 26 332 C2 | 7/1992 |
| DE | 42 41 224 C1 | 1/1994 |
| DE | 43 37 796 A1 | 5/1995 |
| DE | 44 27 553 C2 | 6/1998 |
| DE | 298 03 336 U1 | 7/1998 |
| DE | 298 06 179 U1 | 10/1998 |
| DE | 198 02 287 C1 | 12/1998 |
| DE | 197 13 580 C2 | 12/1999 |
| DE | 198 32 884 C1 | 12/1999 |
| DE | 697 00 589 T2 | 5/2000 |
| DE | 198 07 737 C2 | 6/2000 |
| DE | 199 32 962 A1 | 1/2001 |
| DE | 100 56 900 C1 | 8/2002 |
| DE | 197 53 436 C2 | 10/2002 |
| DE | 101 32 413 C2 | 7/2003 |
| DE | 102 42 345 B3 | 2/2004 |
| DE | 101 40 270 B4 | 9/2004 |
| DE | 10 2005 003 617 B3 | 6/2006 |
| DE | 10 2005 003 615 B3 | 9/2006 |
| DE | 20 2008 003 703 U1 | 5/2008 |
| DE | 10 2007 038 626 B3 | 10/2008 |
| DE | 10 2007 050 176 A1 | 4/2009 |
| DE | 10 2008 003 524 B4 | 12/2009 |
| DE | 10 2008 012 011 B3 | 12/2009 |
| DE | 10 2008 030 773 A1 | 12/2009 |
| DE | 10 2010 061 148 A1 | 6/2012 |
| DE | 10 2004 009 489 B4 | 9/2013 |
| DE | 10 2011 052 967 B4 | 12/2013 |
| DE | 10 2015 107 302 A1 | 11/2016 |
| EP | 0 471977 B1 | 6/1995 |
| EP | 0 873 582 B1 | 10/1999 |
| EP | 1 724 101 A1 | 11/2006 |
| EP | 2 043 818 B1 | 2/2010 |
| EP | 1 724 101 B1 | 2/2011 |
| EP | 2 305 428 A1 | 4/2011 |
| EP | 2 463 969 A2 | 6/2012 |
| EP | 2 672 580 A1 | 12/2013 |
| EP | 2 698 885 A1 | 2/2014 |
| EP | 2 562 891 B1 | 3/2016 |
| EP | 3 012 923 A1 | 4/2016 |
| EP | 3 012 924 A1 | 4/2016 |
| EP | 2 672 580 B1 | 2/2017 |
| EP | 3 208 044 A1 | 8/2017 |
| EP | 3 396 796 A1 | 10/2018 |
| EP | 3 572 187 A2 | 11/2019 |
| EP | 3 656 504 A1 | 5/2020 |
| EP | 3 553 900 B1 | 7/2020 |
| EP | 3 572 188 B1 | 10/2020 |
| EP | 3 820 001 A1 | 5/2021 |
| EP | 3 614 507 B1 | 9/2021 |

OTHER PUBLICATIONS

Publication "Crimptechnik, Herstellung prozesssicherer Verbindungen von elektrischen Leitern und Steckern" of the Wezag GmbH Werkzeugfabrik company, Die Bibliothek der Technik 342, Verlag Moderne Industrie, ISBN 978-3-68236-027-7.

* cited by examiner

FORCE SENSORS FOR CRIMPING PLIERS AND CRIMPING PLIERS COMPRISING A FORCE SENSOR

CROSS REFERENCE TO RELATED APPLICATIONS

This application claims priority to co-pending German Patent Application No. EP 22 161 157.7 filed Mar. 9, 2022.

FIELD OF THE INVENTION

The invention relates to crimping pliers wherein the crimping force which is effective during a crimping process is measured by a force sensor. This might e.g. be used for monitoring the crimping process, for a quality assurance and/or for a documentation of the crimping process. Furthermore, the invention relates to a crimping pliers force sensor.

Manually actuated crimping pliers of the present type serve for crimping a workpiece (in particular for crimping a plug or a connector to an electrical cable). Here, the crimping pliers might e.g. be embodied according to one of the publications EP 3 208 044 A1, EP 3 012 924 A1, EP 3 012 923 A1, EP 2 698 885 A1, EP 2 672 580 A1, EP 2 463 969 A2, DE 37 08 727 C2, DE 40 23 337 C1, DE 40 26 332 C2, DE 40 39 435 C1, DE 42 41 224 C1, DE 44 27 553 C2, DE 197 13 580 C2, DE 197 53 436 C2, DE 198 02 287 C1, DE 198 07 737 C2, DE 298 03 336 U1, DE 198 32 884 C1, DE 100 56 900 C1, DE 101 32 413 C2, DE 101 40 270 B4, DE 102 42 345 B3, DE 10 2005 003 615 B3, DE 10 2005 003 617 B3, DE 10 2007 038 626 B3, DE 10 2008 003 524 B4, DE 10 2008 012 011 B3, DE 20 2008 003 703 U1, EP 1 724 101 A1, EP 2 305 428 A1, DE 10 2010 061 148 A1, DE 10 2011 052 967 B4 or according to manual crimping tools distributed by the applicant under the labels CS10, CSV10, CSV10-LWL, CSV10-FFC, AE, CS8, CK100, CS30, CS KTVR, CE/CG, CS150, CS200, CS210, CP600 on the application date of the present patent application.

The crimping pliers in particular serve on the one hand for generating a permanent mechanical connection between the plug or connector and the cable in the region of the insulation of the cable by means of an insulation crimp and on the other hand for providing a permanent electrical contact between the plug or connector and the electrical wire of the cable by means of a wire crimp. Dependent on the used profile of the dies different crimping processes can be executed by the crimping pliers.

For example, the wire crimp might be a closed crimp in which the cable is inserted into a closed crimping zone of a plug or into a closed sleeve and is crimped by plastic deformation of the crimping zone or the sleeve. However, it is also possible that an open crimp is produced in which the plug comprises an open crimping zone into which the conductor can be inserted from above. To mention only some examples not limiting the invention, with the crimping pliers     cable shoes or terminals according to German standard DIN 4623,     aluminum connectors according to German standard DIN 46329,     aluminum press-fit terminals according to German standard DIN 48201,     crimp terminals or squeezing cable shoes according to German standard DIN 46234,     pin terminals or pin cable shoes according to German standard DIN 46230 or     connectors, plugs or terminals for a connection to a cable as described in the product catalog "Werkzeuge für die professionelle Anwendung" of WEZAG GmbH Werkzeugfabrik (publication no. 10/11)

can be crimped.

For a closed crimp the produced crimp may be a hexagonal crimp, a square crimp, a B crimp, a trapezoidal crimp, a modified trapezoidal crimp, an oval crimp, a mandrel crimp or a double mandrel crimp. An open crimp may e.g. be realized as a V crimp or B crimp, a rolled crimp or a double rolled crimp.

In addition to establishing the electric connection between cable and plug, a mechanical connection may be established by means of a so-called insolation crimp. Here, a closed insolation crimp or an open insolation crimp (especially a V crimp or B crimp, O crimp or OV crimp) may be employed. With regard to further information     on a design of generic crimping pliers,     on possible applications of generic crimping pliers and/or     on different possible types of crimp connections which can be produced with the generic crimping pliers reference is made to the document     "Crimptechnik, Herstellung prozesssicherer Verbindungen von elektrischen Leitern und Steckern" of WEZAG GmbH Werkzeugfabrik (Die Bibliothek der Technik 342, Verlag Moderne Industrie, ISBN 978-3-68236-027-7).

BACKGROUND OF THE INVENTION

The publication DE 10 2007 050 176 A1 describes that when crimping a connector to an electric cable by use of crimping pliers a quality assurance on the basis of a monitoring of the crimping force is required due to the increasing complexity of cable harnesses, an aggravation of product liability and increased warranty demands. A force measuring device is proposed which can be embodied as a piezoelectric force sensor or as a strain gauge. The force measuring device is located on an outer side of a crimping punch or within the crimping punch or in a crimping accommodation. Furthermore, the crimping pliers comprise a transmitter which is arranged above the crimping plug on the crimping pliers head. The transmitter transmits a wireless crimping force signal which is received and processed by a receiving and processing device. The transmitter can be activated and deactivated by manipulation elements. Furthermore, by means of these manipulation elements it is possible to adjust the frequency of the transmitter under certain conditions. A power source embodied as an electric battery or a rechargeable accumulator is provided in the transmitter for the supply of power to the transmitter and the force measuring device. The publication also proposes that the transmitter might comprise an induction coil wherein an outer magnetic field induces an induction current for recharging the accumulator. It is also proposed to mount a photovoltaic cell to the crimping pliers for recharging the accumulator. Finally, the publication also proposes that a temporary cable connection is provided. The transmitter comprises a displaying device on which the crimping force, the transmitting frequency, the presence of a wireless connection, the loading state of the power source and the like can be displayed. The displaying device might be embodied as a LED- or LCD-displaying device. Additionally, a displacement measuring system for sensing the working stroke of the crimping pliers can be provided at the crimping pliers. For avoiding damages the crimping pliers might comprise a ratchet device or overload slipping device which limits the applicable crimping force to a given value. Furthermore, the publication proposes that the receiving and processing device might be embodied as a commercially available personal computer comprising a Bluetooth receiver.

The publication DE 298 06 179 U1 describes that it is known from DE 40 14 221 A1 to monitor the quality of the produced crimping connection in a crimping machine by sensing the crimping force. For this purpose the crimping punch, the crimping die or the sub-structure is an elastic body to which a strain gauge is mounted. The displacement of the crimping punch is sensed by an inductive displacement sensor. On this background the publication proposes to sense a crimping force and the crimping displacement also for crimping pliers. For this purpose a first force sensor is used which directly senses the crimping force in the bit of tongs. A second force sensor senses the opening displacement of the bit of tongs so that by means of the second force sensor the crimping displacement is indirectly sensed. Here, strain gauges or piezo-electric force sensors are used as the force sensors. Here, it is possible that a strain gauge is attached to a leaf spring which is tensioned by the closing movement of the crimping pliers. The publication also proposes that the first force sensor is attached to an intermediate part of the lever drive of the crimping pliers or that the first sensor (with the crimping die attached thereto) is arranged between the crimping die and the pliers jaw. A reference sensor can be used for allowing a temperature compensation. A processing circuit can be provided on the crimping pliers, the processing circuit comprising a suitable display for informing the user of the crimping pliers during the crimping process about the quality of the crimping process. It is also possible that the crimping pliers comprise a data storage wherein it is possible to store force-displacement-curves for different types of crimps (in particular for different types of contacts or plugs) so that for a specific crimp the associated force-displacement curve is available for the quality control. As an optical displaying device on the crimping pliers a display based on light-emitting diodes or a liquid crystal display can be used. Additionally, a signal can be output via an acoustic output device. If an optical displaying device consisting of light-emitting diodes or an acoustic output device is used, by means of the same the successful execution of the crimping process can be confirmed by different colors or sounds. As an interface for a stationary computer a cable-bound or optical interface or any possible interface transmitting via air which bases on electromagnetic radiation in the visible, infrared or RF-region can be used for the date exchange. Here, also a bi-directional interface can be used. It is also possible that the closing movement of the bit of tongs of the crimping pliers is supported by an electric servomotor. The monitoring of the crimping force curve can consist of a comparison of a measured crimping force curve with a predefined crimping force curve (in some cases with a predefined tolerance region).

The patent DE 10 2004 009 489 B4 lists the publications U.S. Pat. No. 5,195,042, DE 298 06 179, DE 199 32 962 and DE 697 00 589 as relevant prior art for the use of displacement-force-measurement systems in the crimping technology and relates to an electronic monitoring of an adjustment process of crimping pliers.

The patent application DE 10 2008 030 773 A1 lists the publications DE 40 14 221, DE 43 37 796, DE 199 32 962, DE 29 806 179.1 and U.S. Pat. No. 5,490,406 as relevant prior art with respect to known electronic devices for force-displacement-measurements in crimping pliers. Also this patent application DE 10 2008 030 773 A1 relates to the electronic monitoring of the process of adjusting the crimping pliers. Here, a sensor system is used which senses the crimping displacement in increments or by absolute measurements. It is possible that by a control unit, monitoring unit and processing unit an electronic image is generated at a LCD display. A cassette can be used into which a computer system as well as a constructional unit serving as the accommodating and adjusting device with the sensor system can be integrated. Constructional units can be assembled to and disassembled from completely assembled pliers allowing an exchange according to the needs.

The European patent EP 2 043 818 B1 (corresponding to U.S. Pat. No. 7,793,571 B2) proposes equipping manually actuated pliers with a signaling device which allows that the arrival at a predefined closing force can be sensed by the hand of the user. For this purpose, the signaling device is embodied as a vibrator integrated into one of the hand levers.

The publication EP 2 698 885 A1 (corresponding to US 2014/047885 A1) discloses a non-generic crimping machine wherein different exchangeable adaptors can be used. The exchangeable adaptors each comprise a punch and an anvil. Furthermore, in each of the exchangeable adaptors a sensor is integrated which senses a crimping force and/or a crimping displacement. Here, in the exchangeable adaptors sensors having different measurement regions can be used for different applications. A force sensor can be integrated into a recess of the anvil or the punch of the exchangeable adaptor. A deformation of the anvil or the punch then leads to a bias of the sensor arranged in the recess with a force. In this case, the elastically deformable portions of the anvil or the punch are arranged in mechanical parallel arrangement to the support via the sensor. A calibration of the exchangeable adaptor and of the force sensors of the same can be done in the factory or after the delivery of the exchangeable adaptor. Determined calibration factors or calibration curves can then be modelled or stored in a control unit which is integrated into the exchangeable adaptor.

The publication EP 3 396 796 A1 (corresponding to U.S. Pat. No. 2,018,309 256 A1) proposes that in crimping pliers both pliers jaws are supported by a pivot joint on a fixed pliers part which comprises a fixed hand lever. One pliers jaw can be moved from an open position to a closed position by a manual actuation of a moveable hand lever via a toggle lever drive over the crimping stroke. The other pliers jaw is supported via a mechanical parallel arrangement on the one hand by a spring embodied as an elastomeric body and on the other hand by a crimping pliers force sensor on the fixed pliers part. Accordingly, the force flow of the crimping force is divided into two force flow parts with two crimping force components. As a consequence, the crimping pliers force sensor is not biased by the whole crimping force but only with a crimping force component which leads to decreased demands for the crimping pliers force sensor with respect to the maximum of the admissible force. Here, the crimping pliers force sensor bases on a (in particular semi-spherical) elastic calotte which is pressed by the crimping force component biasing the force sensor against a sensor surface. Here, the size or the diameter of the contact surface between the elastic calotte and the sensor surface depends on the crimping force component. The size of the contact surface is sensed by a series or matrix of contacts or switches arranged in the sensor surface. The number of actuated contacts or switches correlates with the size of the contact surface. It is then possible to determine the crimping force component from the size of the contact surface sensed in this way on the basis of the deformation characteristic of the calotte and then to determine the crimping force from the a-priori known dependency of the crimping force component from the crimping force.

US 2008/0078255 A1 discloses a non-generic crimping machine comprising a die held by an anvil and a die held by a punch. The punch is guided on a frame of the crimping machine. In the anvil the crimping force biases a sensor device. In the sensor device a piezo-electric polymeric foil is sandwiched between two plates. Preferably, the piezoelectric polymeric foil comprises polyvinylidene fluoride (PVDF). The piezo-electric polymeric foil serves for measuring the crimping force during the crimping process executed by the machine. In order to avoid a misalignment of the dies or the punch and the anvil it is also possible that the force flow runs along two piezo-electric polymeric foil elements arranged in mechanical parallel arrangement. According to US 2008/0078255 A1, by the use of the piezo-electric polymeric foil it is intended to make the use for an assembly bolt (as required for force sensor embodied as sensor rings) dispensable. On the other hand, the use of the piezo-electric polymeric foil or of the polymeric foil elements aims for reducing an error source if the bias does not have an exact axial orientation and for avoiding a tilting and for avoiding biases with a bending moment as being the case for crystal or ceramic sensors.

Further prior art is known from DE 10 2015 107 302 A1.

The publication EP 3 820 001 A1 (corresponding to U.S. Pat. No. 2,021,140 840 A1) which is the closest prior art discloses a crimping pliers force sensor wherein a piezoelectric film is arranged between plane and parallel contact surfaces of a supporting body and a transfer body. The piezoelectric film can be arranged loosely between the supporting body and the transfer body, can be clamped between the same or can be adhered to the supporting body and/or to the transfer body. The supporting body is supported for being pivoted about a pivot axis having an orientation vertical to the pivot plane of the pliers jaws on the fixed pliers part of the crimping pliers. A die back of an exchangeable die is supported on the transfer body. Here, the die comprises an elongated hole having an orientation in the direction of the crimping axis. A holding and guiding bolt held by the fixed pliers part extends through the elongated hole. The holding and guiding bolt on the one hand provides that the die is held by the fixed pliers part in a loss-proof way. On the other hand, the engagement of the holding and guiding bolt with the elongated hole provides that the die half has a limited degree of freedom in the direction of the crimping axis which is required for biasing the piezoelectric film with the crimping force. The piezoelectric film is connected by a connecting cable to an electronic constructional unit of the crimping pliers. A signal processing and analysis of the signals of the piezoelectric film and so the determination of the crimping force is provided by the electronic constructional unit. The piezoelectric film can be folded between the transfer body and the supporting body to at least two layers with the same sensor surfaces or sensor surface areas. Both sensor surfaces are then biased by the crimping force and the associated surface pressure so that the load change of the piezoelectric elements of the piezoelectric film caused by the crimping force is increased and the sensitivity of the crimping pliers force sensor can be increased.

SUMMARY OF THE INVENTION

The invention proposes a crimping pliers force sensor which comprises a transfer body, a supporting body and at least one piezoelectric film arranged between the transfer body and the supporting body. In so far, the crimping pliers force sensor might also generally be embodied according to the prior art, in particular according to the prior art mentioned in the beginning (e.g. EP 3 820 001 A1).

According to the invention a notably simple provision of the connection or guidance between the transfer body and the supporting body is proposed: The transfer body and the supporting body comprise protrusions and recesses. For a simplification in the following the invention is in some cases explained on the basis of protrusions of the supporting body and recesses of the transfer body. However, it is also possible that the protrusions are provided at the transfer body and the recesses are provided at the supporting body or that the transfer body and the supporting body each comprise at least one protrusion and at least one recess.

The transfer body and the supporting body are guided by the protrusions and recesses in a plane having an orientation transverse to the crimping force. At the same time, the protrusions and recesses provide a degree of freedom between the transfer body and the supporting body in the direction of the crimping force. The degree of freedom is required for biasing the piezoelectric film arranged between the transfer body and the supporting body with crimping force. It is possible that the transfer body is captured in the transversal plane in the region of the recesses between the protrusions of the supporting body. In this case also a certain play can be provided. Here, it is possible that only two protrusions of the supporting body cooperate with two recesses of the transfer body. In this way a guidance in a transversal direction as well as a guidance in orthogonal transversal directions can be provided. However, it is also possible that the supporting body comprises three or four protrusions between which the transfer body can then be captured in the region of the recesses in different transversal directions.

Some embodiments of the invention in particular base on the finding that a pivotable support of the transfer body for guiding the same according to EP 3 396 796 B1 can be complex and might require additional constructional space and might involve additional costs and assembly effort which can be reduced by the proposed measures. On the other hand, embodiments of the invention also base on the finding that the exclusive holding of the transfer body on the supporting body by bondings to the piezoelectric film according to EP 3 820 001 A1 might lead to the result that forces being effective in the transversal plane between the transfer body and the supporting body bias the piezoelectric film which might lead to measurement errors and/or damages of the piezoelectric film.

The invention proposes a crimping pliers force sensor (and crimping pliers with a crimping pliers force sensor of this type) which for some embodiments is improved with respect to the construction effort and the assembly effort and/or the biases of the crimping pliers force sensor and/or the design of the electric measurement circuit and/or the processing and analysis of the measurement signal.

For a particular simple embodiment the transfer body is exclusively held by the bondings to the at least one piezoelectric film and the interaction between the protrusions and recesses on the supporting body whereas no additional holding connections of the supporting body with other components of the crimping pliers are present.

In the case that the supporting body comprises protrusions having an orientation of the direction of the crimping force the protrusions might comprise any cross section, in this case the geometry of the recesses of the transfer body being correspondingly adapted. It is e.g. possible that the protrusions are pins of the supporting body having a circular cross section which are accommodated in recesses embodied as bores of the transfer body.

For a particular proposal the protrusions of the supporting body have a rectangular cross section. It is possible that the transfer body is embodied as a transfer plate so that a very simple manufacturing of the transfer body is possible. By use of a plate, in some cases the plane parallelism of the contact surface of the transfer plate with the die back of the die and the contact surface for the piezoelectric film can be provided in a simple fashion. In this case the recesses can be embodied as rectangular corner cutouts (which are not necessarily produced by "cutting" but can be produced by any manufacturing process) of the corners of a rectangular transfer plate. The legs of the rectangular corner cutouts then cooperate with two adjacent sides of the rectangular cross section of the protrusions of the supporting body so that the guidance explained above can be provided.

Accordingly, it is possible that for some embodiments in a transversal plane the recesses have a cross section having an open edge (as e.g. being the case for the corner cutouts explained above). However, it is also possible that in the transversal plane the recesses comprise a cross section having a closed edge (as e.g. being the case for the guiding bores explained above for accommodating the cylindrical pin).

It is generally possible that in the transversal plane the piezoelectric film extends only in the region within or between the protrusions and recesses. For a particular proposal the at least one piezoelectric film also comprises film recesses. These film recesses allow that the protrusions of the transfer body or supporting body are able to extend into the recesses of the supporting body or transfer body. This leads to the advantage that the piezoelectric film and the contact surfaces of the same with the transfer body and the supporting body might have a larger area so that the bias of the piezoelectric film can be reduced and/or the measurement accuracy can be increased.

For one embodiment of the crimping pliers force sensor the crimping pliers force sensor comprises a flexible conducting track which might also be embodied as a so-called flex plate printed circuit board. If in the following reference is made to further components of the flexible conducting track, the components can be integrated into the conducting track or applied or mounted to the same. Accordingly, it is e.g. possible that the at least one piezoelectric film is arranged on the flexible conducting track. In the case that two effective sections of the piezoelectric films are present, the two effective sections can be provided at the flexible conducting track with a distance from each other with a folding section of the conducting track arranged there between. In the region of the folding section of the conducting track the conducting track is folded between the two section of the piezoelectric film in order to provide two layers of the piezoelectric film in the force flow between the transfer body and the supporting body.

It is possible that the flexible conducting track (additional to the at least one piezoelectric film) in another section of the same comprises an electronic control unit. Preferably, the electronic control unit analyses the measurement signal of the at least one piezoelectric film. This might be accomplished under consideration of a dependency being specific for the at least one piezoelectric film. The dependency might e.g. be a calibration factor by which the measurement signal of the at least one piezoelectric film is converted into the crimping force (or a corresponding or normalized quantity). However, it is also possible that any other type or modeling of a dependency (e.g. a linear or non-linear calibration function, a characteristic calibration map and the like) is considered by the electronic control unit.

Here, it is possible that the electronic control unit considers a dependency which is the same for a plurality of crimping pliers force sensors. However, this leads to the disadvantage that it is required to keep the measurement inaccuracies of the piezoelectric films and the manufacturing tolerances of the crimping pliers force sensors sufficiently small such that for a plurality of crimping pliers force sensors the determination of the crimping force from the measurement signal with the required accuracy can be provided by use of one and the same dependency. The corresponding might apply for the surrounding area where the crimping pliers force sensor is assembled in the crimping pliers. A reduction of the demands might in some cases be achieved when accepting that (due to manufacturing tolerances or deviations of the measurement behavior of the piezoelectric films) for different crimping pliers force sensors for the same crimping forces or the same crimping force curves different measurement signals are generated. These different measurement signals being specific for each crimping pliers force senor and/or each surrounding assembly area of the crimping plies force sensor in the crimping pliers can then be considered in that the electronic control unit considers a dependency which is specific for each of the crimping pliers force sensors. Here, the specific dependency can be determined for each single crimping pliers force sensor e.g. by the manufacturer of the crimping pliers force sensor or in a calibration process executed by the user of the crimping pliers. The dependency (in particular the specific dependency) can be stored on a storage unit which might also be arranged on or within the flexible conducting track.

Furthermore, for one embodiment the flexible conducting track can be connected to a plug or a connector. By this plug or connector the crimping pliers force sensor can e.g. be connected to an electronic constructional unit of the crimping pliers.

Generally, the flexible conducting track of the crimping pliers force sensor might have any width, thickness, layer composition and any geometry. For one embodiment the flexible conducting track comprises a first leg and second leg. The two legs are then connected to each other by an angled section (which might form a corner or might be rounded).

The two legs might here serve for arranging different electronic components in the region of the legs. It is e.g. possible that in the region of the first leg at least one piezoelectric film, an electronic control unit and/or a storage unit are/is arranged. Instead, in the region of the second leg the aforementioned plug or connector can be arranged (here in the end region arranged remote from the angled section).

On the other hand, it is possible that the different legs of the flexible conducting track consider the assembly situation of the crimping pliers force sensor in the crimping pliers. In this case the different legs might extend in different directions in the crimping pliers. It is e.g. possible that in the assembled state the two legs are folded in the region of the angled section and then in the folded state extend in different planes of the crimping pliers.

Crimping pliers can be equipped with a crimping pliers force sensor as explained before. The crimping pliers comprise a fixed pliers part which integrally comprises a fixed hand lever or supports the same. A supporting body is held on the fixed pliers part. Here, the supporting body might also be supported on the fixed pliers for being pivoted by a pivot bolt about a pivot axis having an orientation transverse to the pivoting plane of the pliers jaws and of the hand levers (as in particular described in EP 3 820 001 A1). However, it is also possible that the supporting body is fixedly held or held with a play on the fixed pliers part. This can also be provided by two transversal bolts of the supporting body being held in accommodating bores of the fixed pliers part. The crimping pliers comprise a toggle lever drive wherein a pressure lever or toggle lever of the toggle lever drive is supported on the fixed pliers part. By means of the toggle lever drive a moveable hand lever is connected to a moveable pliers jaw.

For one embodiment the first leg of the conducting track extends with its longitudinal axis in a longitudinal plane of the crimping pliers. Instead, the second leg of the conducting track extends with its (then in some cases curved) longitudinal axis in a transversal plane of the crimping pliers. This can be achieved be providing a folding or a bending of the conducting track which allows the different extensions. For this proposal it is e.g. possible that the first leg provides a transmission of the measurement signal from the piezoelectric film arranged in the front-end portion of the pliers jaw to an electronic constructional unit of the of the crimping pliers being arranged further in the back on the first leg. Instead, the second leg allows that the first leg (which e.g. extends in an upper end portion of the pliers head) can be connected by the plug or connector to an interface of the electronic constructional unit. By the angular offset of the two legs and the folding and bending present constructional spaces can be used for the different functions and the transmission of the electrical signals.

For one embodiment of crimping pliers the crimping pliers comprise an electronic constructional unit having two printed circuit boards. The printed circuit boards are arranged on different sides of a pliers head of the crimping pliers. The printed circuit board arranged on the different sides can then be connected to each other by a connecting conducting track. In this case the connecting conducting track in a cross section of the crimping pliers extends in a housing of the electronic constructional unit around the fixed pliers part in order to connect the two printed circuit boards. Also, the second leg of the connecting track of the crimping pliers forces sensors extends in a cross section of the crimping pliers within the housing of the electronic constructional unit around the fixed pliers part. Here, the connecting conducting track and the conducting track can at least partially be arranged in the same circumferential section of the cross section. In this case, the connecting conducting track and the conducting track can be arranged with an offset in longitudinal direction of the crimping pliers.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure-not the scope of protection-of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

FIGS. 8 and 9 show the crimping pliers of FIGS. 4 to 7 in a view from the right in a partially disassembled state or a partial section wherein FIG. 8 shows the crimping pliers in a (partially) open state and FIG. 9 shows the crimping pliers in a closed state.

DETAILED DESCRIPTION

In the application text and in the claims constructional elements which have the same or similar functions and/or geometries are partially denoted with the same reference number. In this case these constructional elements can be differentiated from each other by the additional letter a, b. Reference can then be made to these constructional elements with or without the letter which then refers to one constructional element, any number of constructional elements or all constructional elements.

Figure 1:
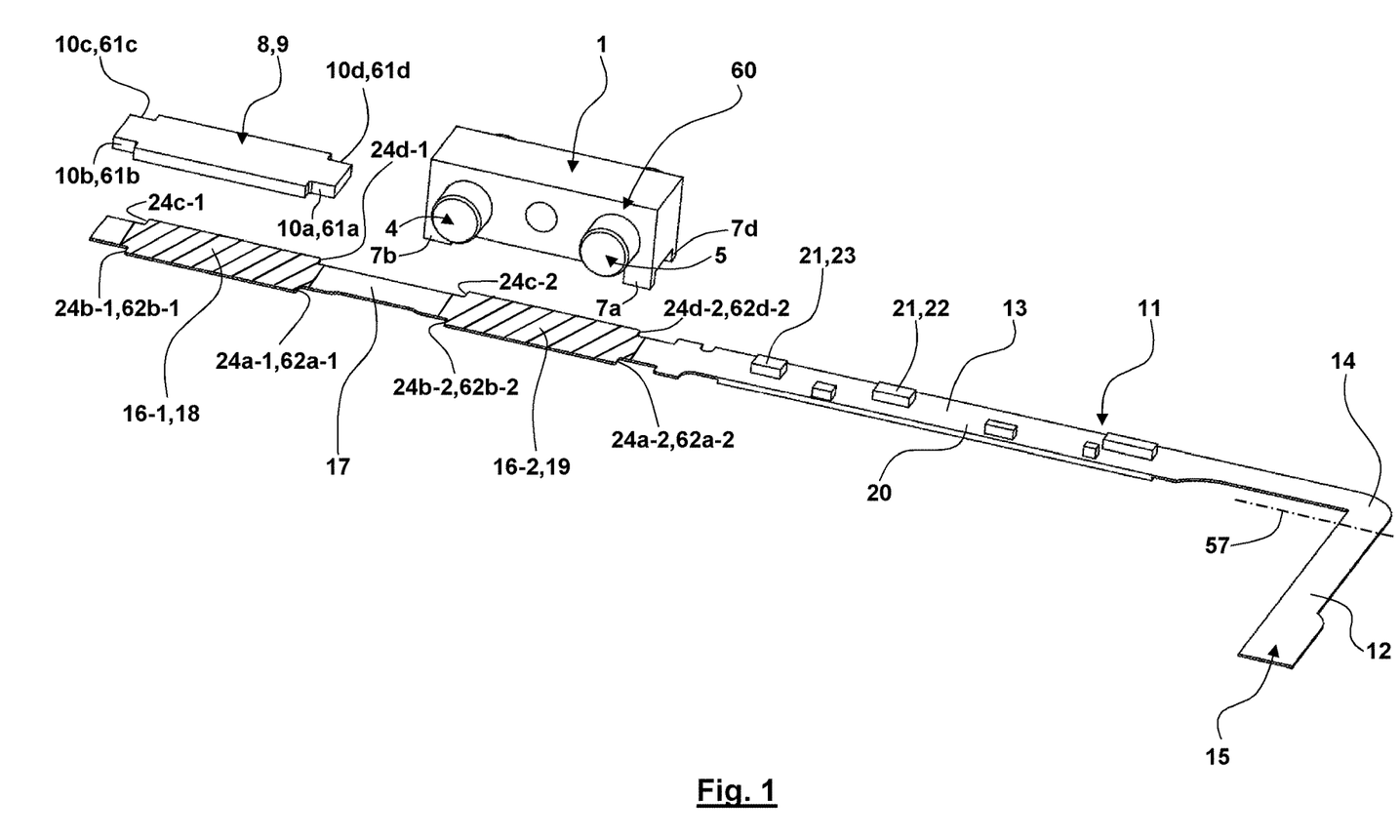
FIG. 1 in a three-dimensional exploded view shows a supporting body, a transfer body and a flexible conducting track of a crimping pliers force sensor.
Figure 2:
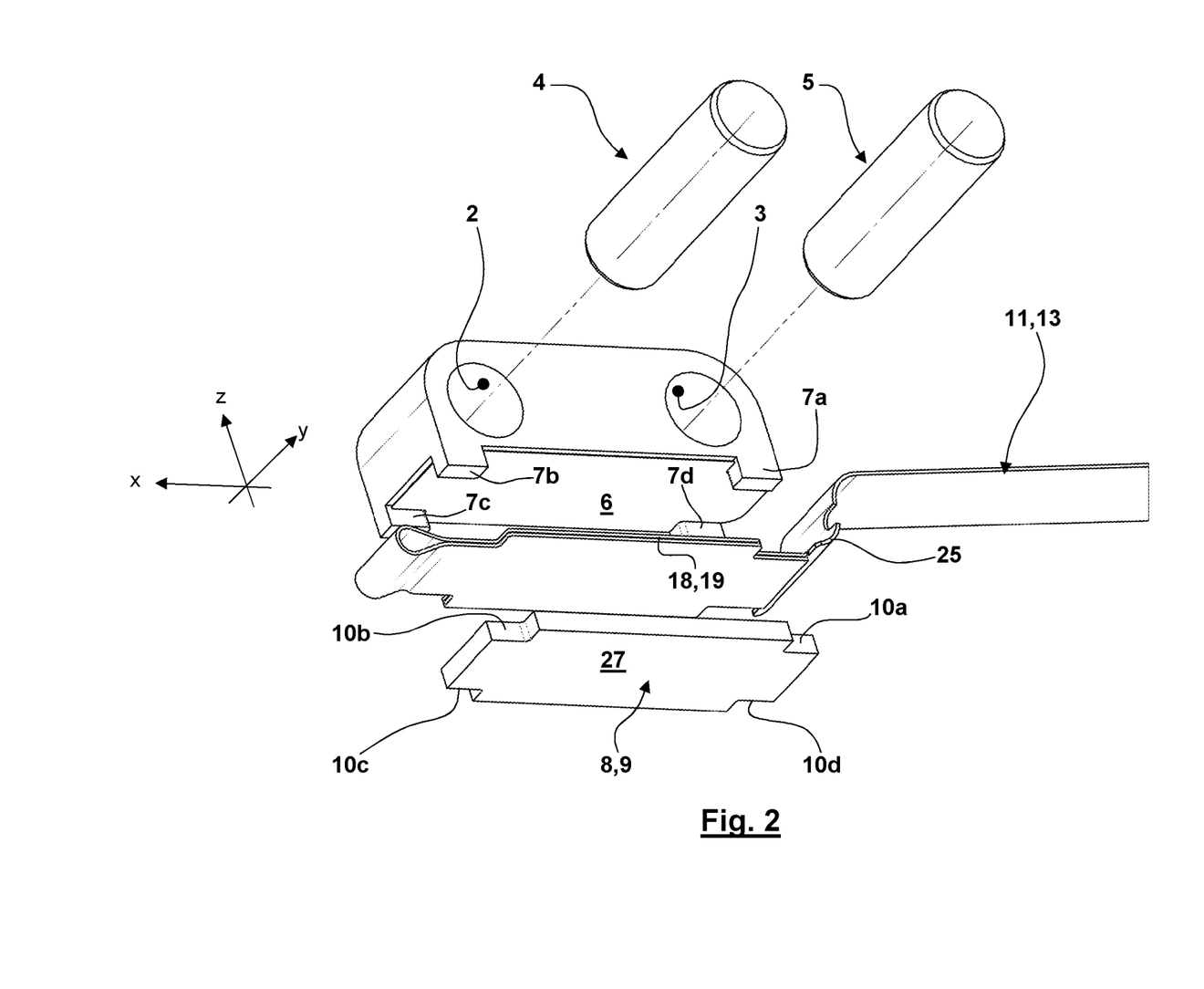
FIG. 2 shows another three-dimensional exploded view of the supporting body, the transfer body and a subsection of the flexible conducting track of FIG. 1.

FIGS. 1 and 2 show a supporting body 1 which in a first rough approximation has a cuboidal design. The supporting body 1 comprises through bores 2, 3 having an orientation transversal to a pliers head plane. Holding bolts 4, 5 extend (in particular with a press fit) through the through bores 2, 3. The holding bolts 4, 5 protrude with two end portions from the supporting body 1.

On the lower side which in the assembled state faces towards a die of the crimping pliers the supporting body 1 comprises a contact surface 6 having a large area. Protrusions 7*a*, 7*b* 7*c*, 7*d* arranged at the corners protrude from the contact surface 6. The longitudinal axes of the protrusions 7 extend parallel to the crimping axis. For the shown embodiment the protrusions 7 have a constant rectangular cross section. The contact surface 6 of the supporting body 1 generally has a rectangular shape. However, the corners of the rectangle comprise rectangular corner cutouts in the region of the protrusions 7.

The transfer body 8 is here embodied as a transfer plate 9. The geometry of the transfer plate 9 generally corresponds to the geometry of the contact surface 6 of the supporting body 1. However, a certain play is established between the rectangular corner cutouts 10*a*, 10*b*, 10*c*, 10*d* of the transfer plate and the protrusions 7*a*, 7*b*, 7*c*, 7*d* of the supporting body 1 when inserting the transfer plate 9 between the protrusions 7 into the supporting body 1. In the assembled state the transfer plate 9 is guided floatingly between the protrusions 7 of the supporting body 1. Accordingly, a relative movement is possible in the direction of the crimping axis whereas (after overcoming a certain play) transversal forces being effective in a direction transversal to the crimping axis guide this relative movement.

A conducting track 11 (which might be a conducting band or tape) comprises two elongated legs 12, 13 in the region of which the conducting track 11 might have a slightly varying width. In a top view on the conducting track 11 and in the flattened state the two legs 12, 13 are connected to each other by an angled section 14.

In the end region of the leg 12 arranged remote from the angled section 14 the leg 12 comprises a plug or connector 15.

The leg 13 of the conducting track 11 comprises two film portions 16 which are hatched in FIG. 1. In the specification the single film portions are differentiated from each other by the addition of "-1" respectively "-2". This addition is also used for characterizing the film corner cutouts 24 of the film portions 16-1, 16-2 and of the piezoelectric films 18, 19. In the film portions 16-1 and 16-2 the conducting track 11 forms the piezoelectric films 18, 19 or carries the piezoelectric films 18, 19. Furthermore, the leg 13 of the conducting track 11 comprises a folded section 17 (by which the film portions 16-1, 16-2 are connected to each other) and an electronic portion 20 (in the region of which the electronic constructional elements 21 (in particular an electronic control unit 22 and an electronic storage unit 23) are arranged).

The measurement signal provided by the piezoelectric films 18, 19 is processed and analyzed in the electronic portion 20 by the electronic constructional elements 21 so that a crimping force signal which has already been calibrated or normalized can be transmitted to the plug or connector 15.

In FIG. 1 it can be seen that the film portion 16-1 and the piezoelectric film 18 comprise film corner cutouts 24*a*-1, 24*b*-1, 24*c*-1 and 24*d*-1 which correspond to the corner cutouts 10*a*, 10*b*, 10*c*, 10*d* of the transfer plate 9. The corresponding applies for the film corner cutouts 24*a*-2, 24*b*-2, 24*c*-2 and 24*d*-2 of the film portion 16-2 and the piezoelectric film 19.

FIG. 2 shows that for the assembly of the crimping pliers force sensor the conducting track 11 is folded in the region of the folding portion 17 by 180° transversal to the extensional plane of the conducting track 11 and transversal to the longitudinal extension of the leg 13 (the folding here being a bending). The folding or bending is provided such that the two film portions 16-1, 16-2 and piezoelectric films 18, 19 contact each other in a sandwiched and superposed or congruent fashion.

The side of a film portion 16-2 and of the piezoelectric film 19 facing towards the contact surface 6 can be adhered to the contact surface 6; the two layers formed by the film portions 16 and the piezoelectric films 18, 19 can be adhered to each other; and the transfer plate 9 can be adhered to the film portion 16-1 and the piezoelectric film 18. The above-mentioned geometry of the contact surface 6, of the film portions 16, of the piezoelectric films 18, 19 and of the transfer plate provides that the crimping force is transferred by the complete area, the area generally corresponding to the area of the contact surface 6. Accordingly, the crimping force is not only transferred in the region within the protrusions 7 but also in the edge region between adjacent protrusions 7.

It is possible that in an assembled state the conducting track 11 has any offset or cranking 25.

Figure 3:
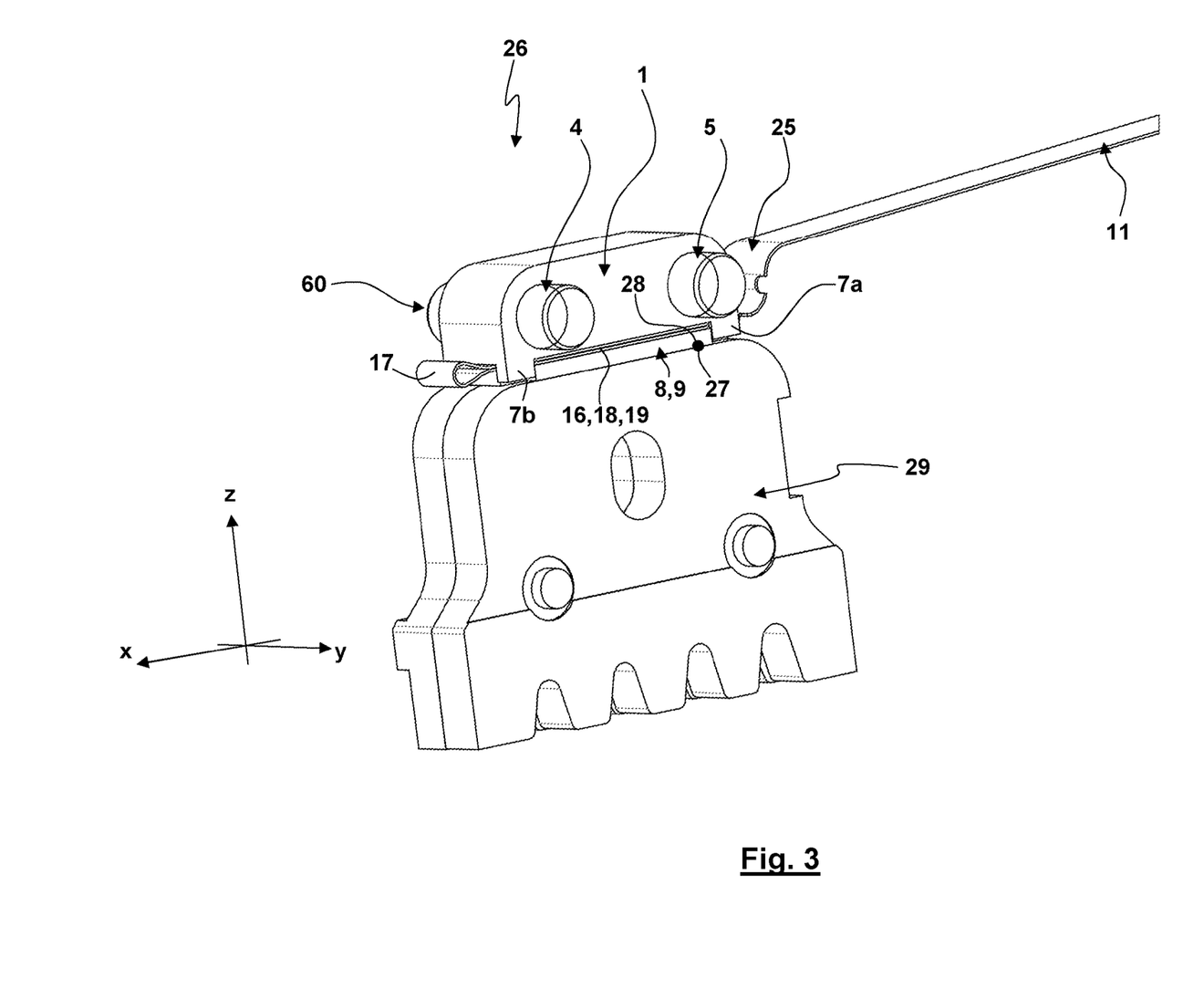
FIG. 3 shows the crimping pliers force sensor of FIGS. 1 and 2 in the assembled state wherein a die contacts the transfer body.

FIG. 3 shows the crimping pliers force sensor comprising the supporting body 1, the conducting track 11 with the piezoelectric films 18, 19 and the transfer plate 9. Here, a die back 28 of a die half 29 contacts a contact surface 27 (established by the transfer plate 9 on the side facing away from the piezoelectric films 18, 19) and is pressed by the crimping force to the same.

Figure 4:
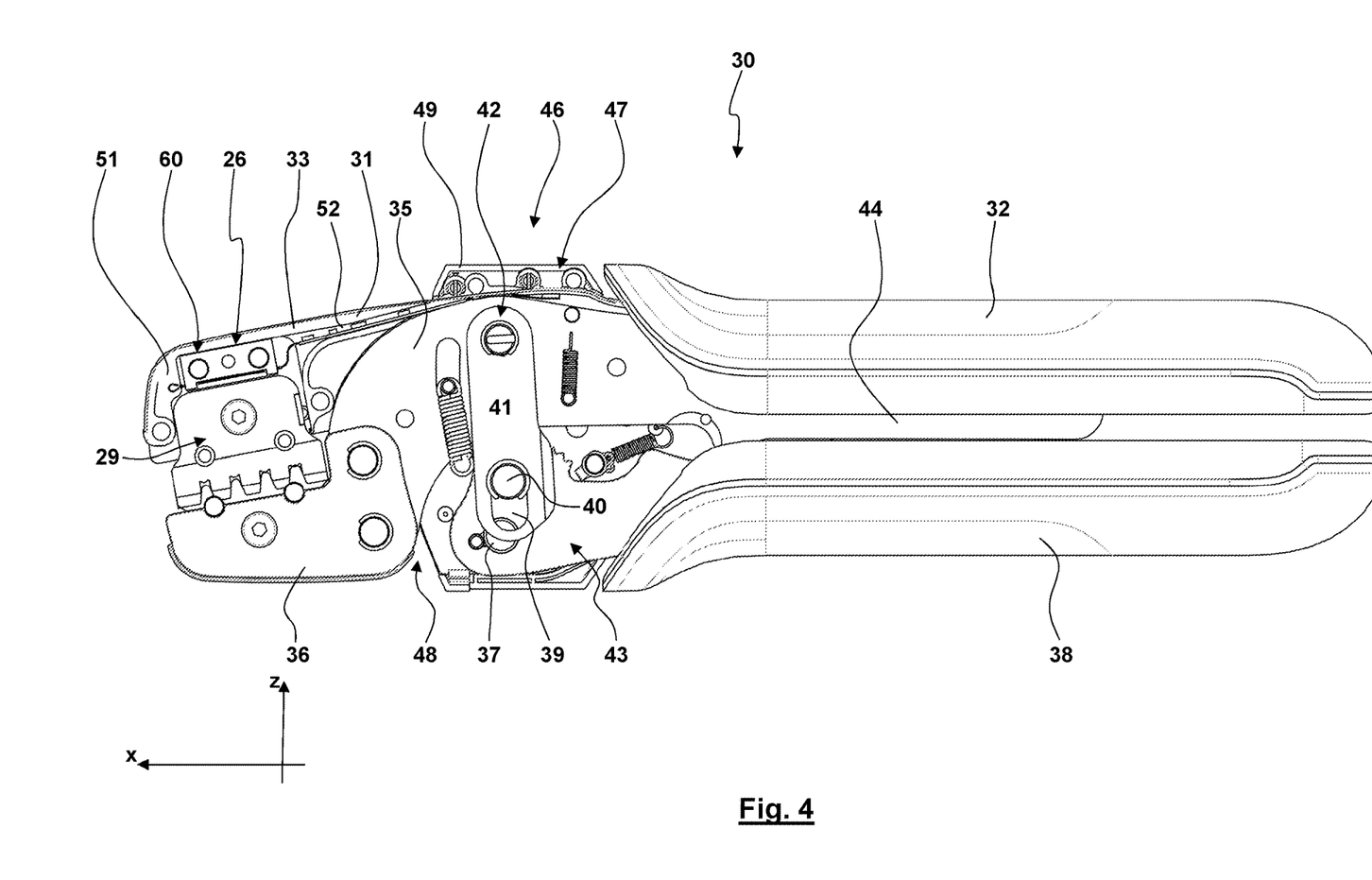
FIG. 4 shows crimping pliers in a partially dissembled view or partial section from the left.
Figure 6:
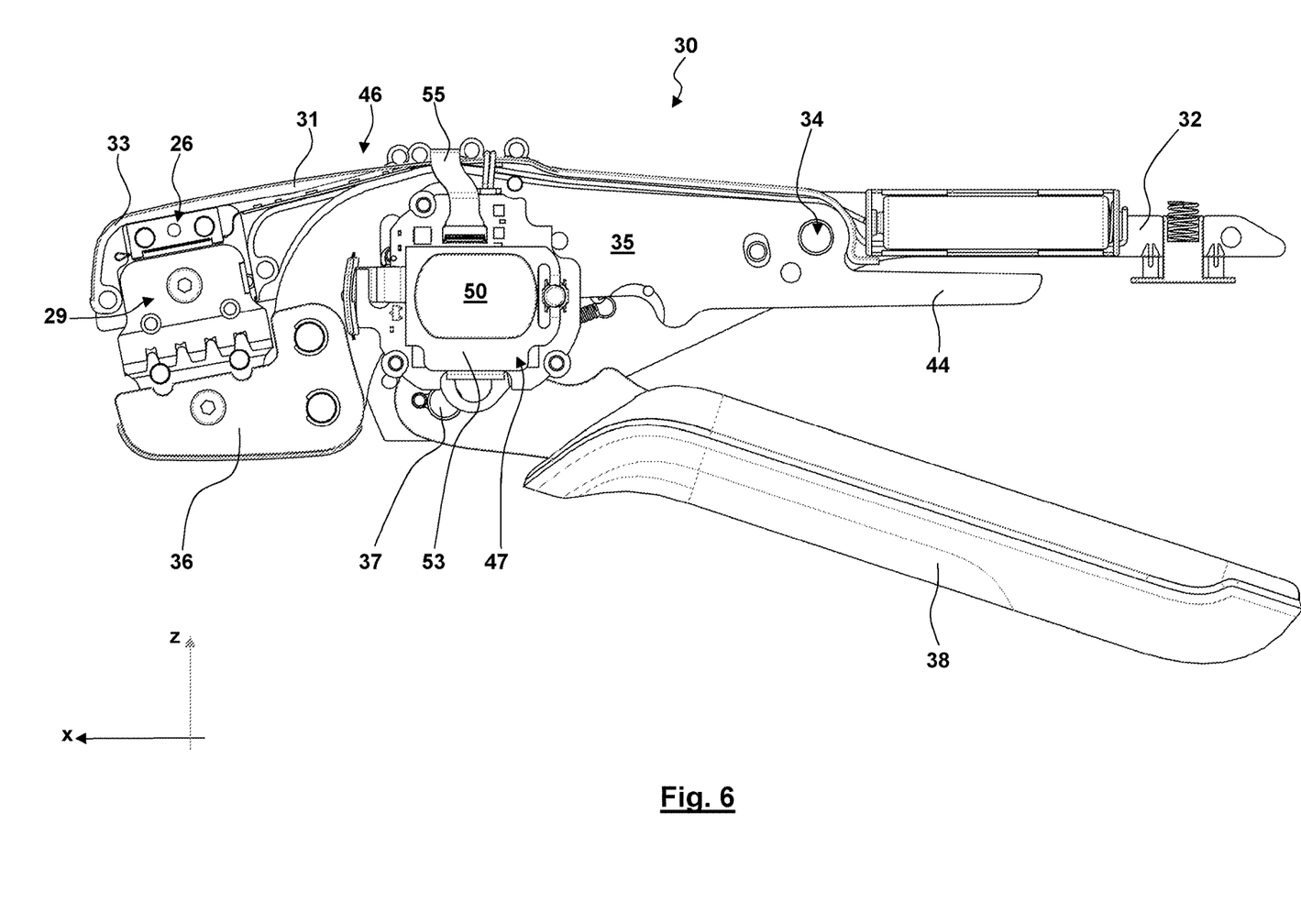
FIG. 6 shows the crimping pliers of FIGS. 5 and 6 in a partially disassembled state or in a partial section in a view from the left.

FIG. 4 shows crimping pliers 30. The crimping pliers 30 comprise a fixed pliers part 31. The fixed pliers part 31 comprises a fixed hand lever 32 and a fixed pliers jaw 33. A moveable pliers part 35 with a movable pliers jaw 36 is supported by pivot bearing 34 (cp. FIG. 6) on the fixed pliers part 31. In a pivot bearing 37 a moveable hand lever 38 is supported for being pivoted on the fixed pliers part 31. An offset or cranking of the movable hand lever 38 in the region of the pivot bearing 37 forms a first toggle lever 39. The toggle lever 39 is connected for being pivoted by a toggle joint 40 to a second toggle lever 41 which is embodied as a pressure lever. The end region of the second toggle lever 41 arranged remote from the toggle joint 40 is supported by pivot bearing 42 on the fixed pliers part 31.

In the closed state of the crimping pliers 30 according to FIG. 4 the toggle lever drive 43 established in this way is in its stretched state so that the opening angle of the two toggle levers 39, 41 is close to the straight state (in particular 170° to 180° or 175° to) 179°. With the opening of the crimping pliers the opening angle of the toggle levers 39, 41 decreases.

As an optional feature the crimping pliers 30 might comprise a third hand lever 44. With the respect to the function of the third hand lever 44 and its integration into the crimping pliers and the extended functionality provided by the third hand lever 44 and different springs used reference is made to the publication EP 3 614 507 B1 which concerning these aspects is incorporated by reference into the present patent application.

For the shown embodiment the moveable pliers part 35 comprises a base body and an L-shaped pliers jaw part 45. Concerning the L-shaped pliers jaw part 45 reference is made to the publication EP 3 553 900 B1 which concerning these aspects is incorporated by reference into the present patent application.

In the region of the pliers head 46 being formed by the crimping pliers 30 aside from the hand levers 32, 38 (and here between the hand levers 32, 38 and the pliers jaw 33, 36) an electronic constructional unit 47 is arranged. The electronic constructional unit 47 surrounds a mechanical pliers part 48 which comprises the constructional elements for the mechanical function of the crimping pliers at least in a part of the circumference (in particular with an U-shape or as a closed ring). The electronic constructional unit 47 comprises a housing 49 preferably made of plastic which is attached to the mechanical pliers part 48 and fixed thereon (in particular with a sealing against the environment). In an inner chamber which is limited by the mechanical pliers part 48 and the housing 49 electronic components are arranged. With respect to the electronic constructional unit (in particular the shape, the connection of the same with the mechanical pliers part 48, the functions, the control logic, an integration of a display device and/or the different outputs generated by the electronic constructional unit 47 on the display device 50) reference is made to the publication EP 3 572 188 B1 which with respect to these aspects is incorporated by reference into the present patent application. The electronic constructional unit 47 can be part of a network and might communicate and exchange data with a computer unit which in some cases again communicates over a public or encrypted network with a cloud computer unit. With respect to these aspects and the exchanged data, the analysis of measurement signals, the provision of recommendations for the used dies in connection with different types of workpieces and/or the consideration of predetermined force characteristics reference is made to the publication EP 3 656 504 A1 which with respect to these aspects is incorporated by reference into the present patent application. Within this frame it is also possible that a die half and/or a type of a workpiece is captured by a camera as in particular described in the publication EP 3 572 187 A2 which with respect to these aspects is incorporated by reference into the present patent application.

FIG. 4 also shows the integration of the crimping pliers force sensor 26 into the pliers head 46. The fixed pliers jaw 33 comprises covering plates which each limit an accommodating chamber 51 in a direction vertical to the pliers head plane of FIG. 4. In the accommodating chamber 51 the transfer plate 9, the piezoelectric films 18, 19 and the supporting body 1 held on the corner plates are accommodated. The accommodating chamber 51 is open towards the moveable pliers jaw 36 so that the die half 29 can be inserted from this side into the accommodating chamber 51 with a movement until the die back 28 contacts the contact surface 27 of the transfer plate 9. In the other directions the accommodating chamber 51 is generally closed by rips or walls extending vertically to the pliers head plane of FIG. 4. However, the accommodating chamber 51 comprises an exit channel 52 also limited by the rips or walls, the exit channel 52 extending to the electronic constructional unit 47. In the exit channel 52 the conducting track 11 (here the electronic portion 20 of the leg 13) is arranged. The longitudinal axis of the electronic portion 20 extends approximately parallel (with an angle being smaller than 30°, being smaller than 20° or being smaller than) 10° to the longitudinal axis of the crimping pliers 30. Here, the transversal direction or the direction of the width of the leg 13 of the conducting track 11 has an orientation vertical to the pliers head plane (so vertical to the drawing plane of FIG. 4 and to the plane wherein the movable pliers jaw 36 and the moveable hand lever 38 are pivoted).

Figure 5:
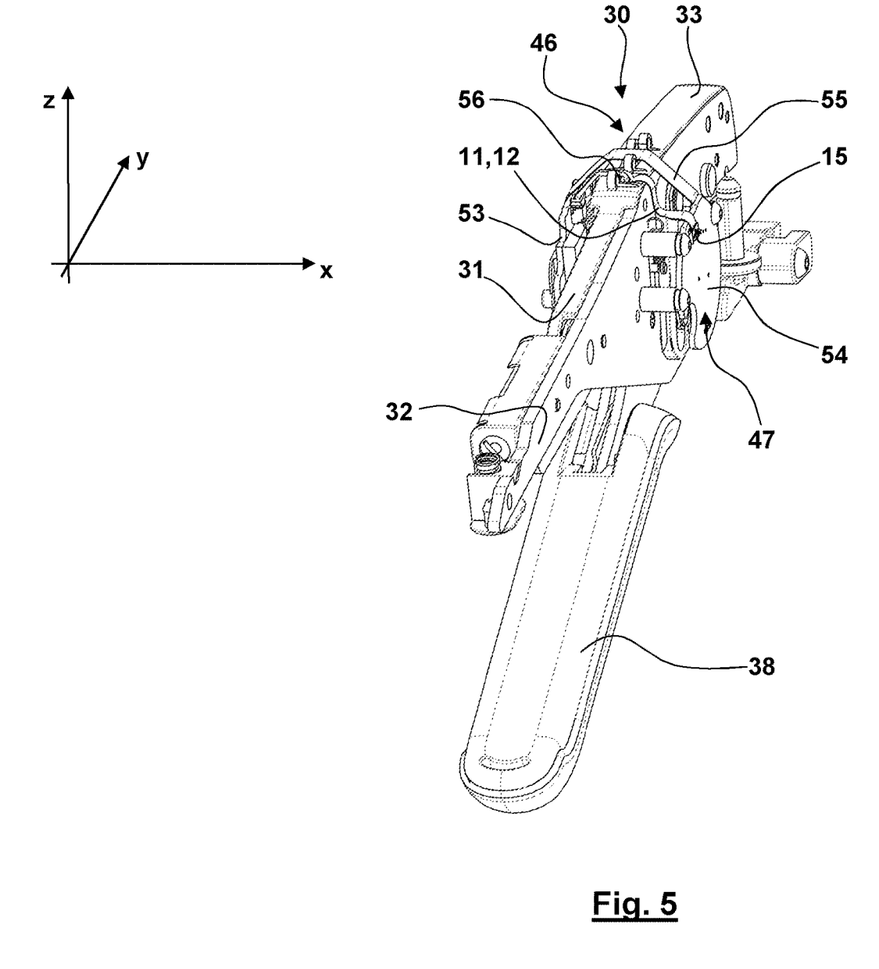
FIG. 5 shows the crimping plies of FIG. 4 in a three-dimensional view from the back and inclined from the right.

FIG. 5 shows the electronic constructional unit 47 without the housing 49. Here, the two printed circuit boards 53, 54 can be seen. The printed circuit boards 53, 54 are connected to each other by a connecting conducting track 55 (in particular a connecting conducting band). The connecting conducting track 55 is arranged in the inner chamber limited in outer direction by the housing 49 and in inner direction by the mechanical pliers 46 and extends in a cross-section x-z in circumferential direction in a first approximation U-shaped around the mechanical pliers part 48.

Furthermore, it can be seen that the mechanical pliers part 48 comprises an opening 56 from which the leg 12 of the conducting track 11 exits out of the mechanical pliers part 48 and out of the exit channel 52. The plug or connector unit 15 of the leg 12 of the conducting track 11 is then connected to an interface of the printed circuit board 54 (as shown in FIG. 5) so that it is possible to transmit the measurement signal or force signal from the crimping pliers force sensor 26 to the electronic constructional unit 47.

The figures show a cartesian coordinate system x, y, z. In this coordinate system the coordinate y (approximately) corresponds to the longitudinal axis of the crimping pliers 30. The coordinate x corresponds to a transversal axis having an orientation transversal to the pliers head plane. The axis z corresponds to a height's direction of the crimping pliers. The plane y-z has an orientation parallel to the pliers head plane. In the plane y-z the moveable hand lever 38 and the moveable pliers jaw 36 are pivoted. The leg 13 of the conducting track 11 extends with its main extensional plane parallel to the x-y-plane. The longitudinal axis of the leg 13 extends in the y-z-plane, preferably approximately parallel to the longitudinal axis y. In the region of the angled section 14 or in the starting region of the leg 12 in the assembled state the conducting track 11 comprises a bending or folding 57 so that the leg 12 extends out of the opening 56 in z-direction. By other foldings or bendings the leg 12 follows the outer contour of the mechanical pliers part 48 to the printed circuit board 54. In the assembled state of FIG. 5 the transversal extension or extension in width direction of the leg 12 extends parallel to the y-axis or longitudinal whereas the longitudinal extension of the leg 12 in a rough approximation extends in the shape of an inverted U within the x-z-plane.

FIG. 6 shows that the printed circuit board 53 comprises a display device 50.

Figure 7:
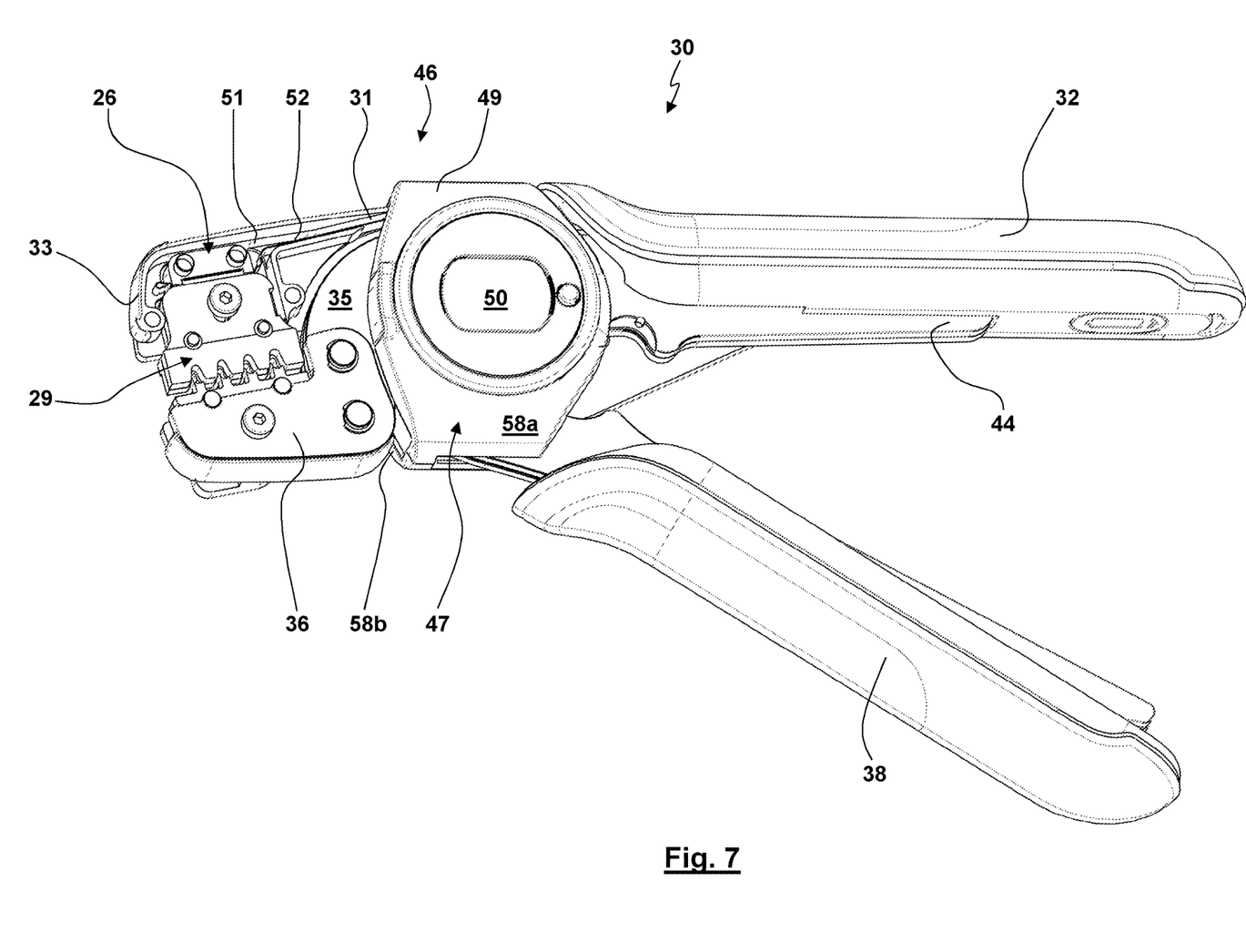
FIG. 7 shows the crimping pliers FIGS. 4 to 6 in a representation generally corresponding to FIG. 6 wherein here the electronic constructional unit is completely assembled.

FIG. 7 shows the electronic constructional unit 47 for the assembled housing 49 (which here comprises two semi shells 58*a*, 58*b* which surround the mechanical pliers part 48 in a ring-shape).

Figure 8:
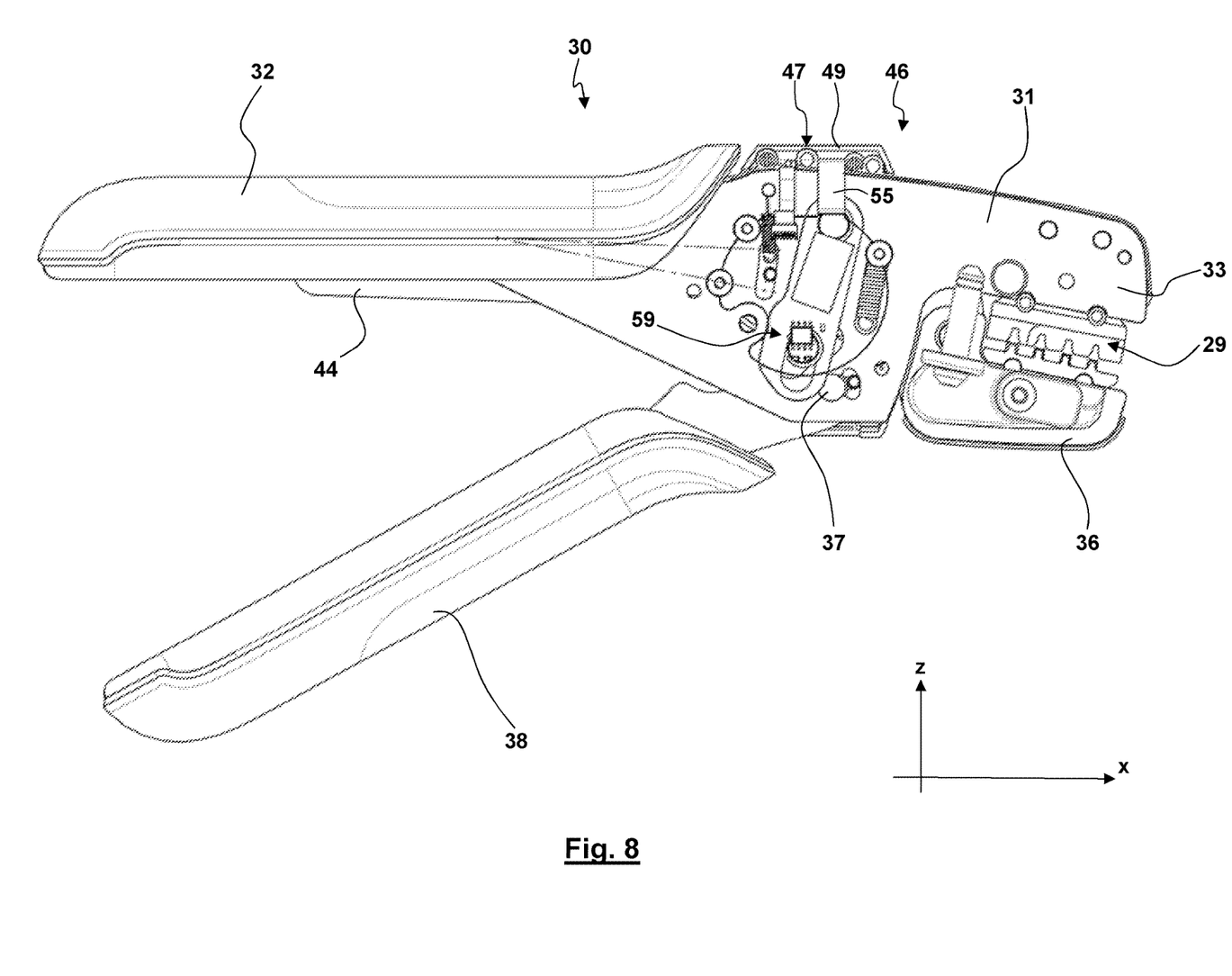
Figure 9:
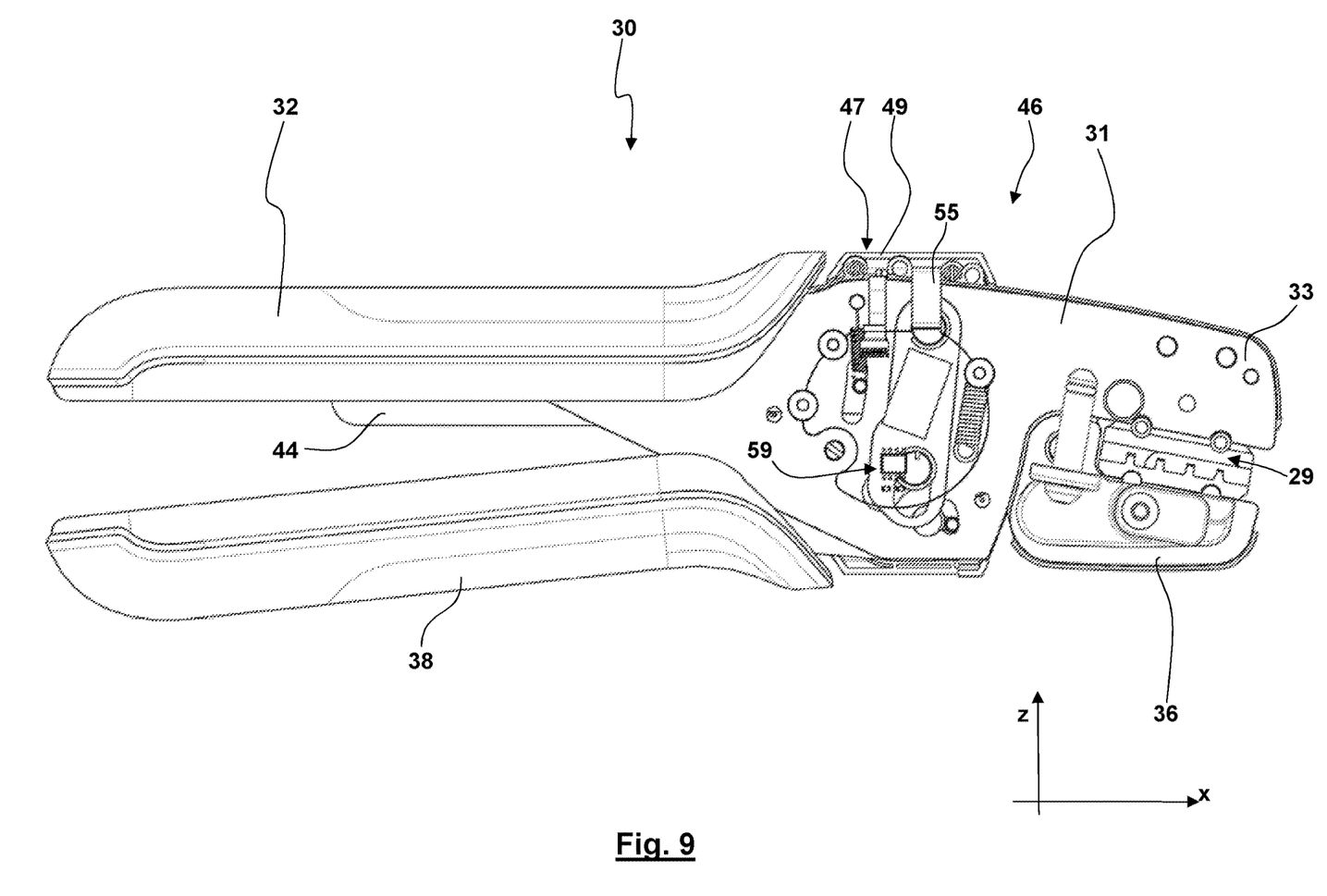

FIG. 8 shows that the crimping pliers 30 comprise a displacement sensor 59. In this case the second toggle lever 41 or the toggle joint 40 carries a first displacement sensor element whereas the printed circuit board 54 carries second displacement sensor element. The displacement sensor 59 senses a relative movement between the two displacement sensor elements over the crimping stroke.

The holding bolts 4, 5 form a mounting portion 60 by which the supporting body 1 is rigidly fixed to the fixed pliers part 31 or supported for being pivoted on the fixed pliers part 31.

The corner cutouts 10 and film corner cutouts 24 form recesses 61 and film recesses 62.

The electronic constructional unit 47 might comprise an electronic control unit, an input element as a switch, sensing device or push button and the like, an output element or display device, a light, an acoustic output element or a sensor. The sensor is in particular embodied as a displacement sensor 59. For the shown embodiment the sensor 59 comprises a first sensor element arranged on a printed circuit board of the electronic constructional unit 47 and a second sensor element held on the toggle lever 41. In this case the displacement sensor 59 senses the relative movement of the sensor elements over the crimping stroke. Preferably on each of opposing sides of the mechanical pliers part a printed circuit board (part) 53, 54 is arranged. The printed circuit boards can then be connected to each other by a connecting conducting track 55.

The electronic constructional unit 47 might comprise two semi-shell typed housing parts which in the assembled state extends like a closed ring in the circumferential direction around the mechanical pliers part. The housing 49 of the electronic constructional unit 47 might comprise a subsection being at least partially translucent for light. In this case a lamp can be arranged within the housing 49 which is arranged and orientated such that light emitted by the lamp biases the at least partially translucent subsection and at least partially extends through this sub portion. The electronic control unit might comprise control logic which analyses a loading state of a battery or accumulator, determines or analyses a number of the past working strokes, evaluates a crimping process executed by the crimping pliers, stores data, activates an operating mode from a standby mode when detecting a movement of the crimping pliers by means of an acceleration sensor, deactivates a display or a lamp when detecting that for a given first time span the crimping pliers have not been actuated or for a predefined second time span the crimping pliers have not been moved wherein the first time span might be longer than the second time span, operates a wireless transmitting and/or receiving device, displays the loading state of a battery or an accumulator by use of a lamp, allows a configuration of the crimping pliers on the basis of the transfer of operating parameters, detects the arrival in a closed state of the hand levers, controls a locating function for locating the crimping pliers, controls a securing of the crimping pliers against theft by setting the crimping pliers out of function, controls in acoustic output of the crimping pliers, performs an electronic insertion control for controlling the insertion of a workpiece into the pliers mouth according to the specifications and/or generates an image (which might by a name or label of a manufacturer, an owner or a user, a loading state of a battery or accumulator, or a measured crimping force or a measured crimping displacement or a curve of the same, or a number of the pass working strokes, the result of an evaluation of an crimping process executed by the crimping pliers and/or an indication of a required maintenance of the crimping pliers or correlate therewith). With the respect to the design to the electronic constructional unit, the interaction with the mechanical pliers part of the crimping pliers and the functions provided by the electronic constructional unit reference is made to the patent publication EP 3 572 188 which with respect to these aspects is incorporated by reference into the present patent application.

It is furthermore possible that the crimping pliers in a wireless fashion communicate via the electronic constructional unit with an electronic control unit (in particular a cellphone or a computer in the working environment of the crimping pliers). It is additionally possible that this external electronic control unit again communicates with a cloud storage. These communication paths might in particular be used for documenting the crimping process, the used dies, the crimping force curves and/or the crimping displacements, the number of the crimping strokes passed by the crimping pliers or a die and the like.

It is also possible that the electronic constructional unit or the crimping pliers comprise a capturing device which is designed for capturing a label of the die half(s). This capturing device can be arranged adjacent to the die half. The capturing device might be a capturing device for a label embodied as an optical coding of a die half, a mechanical sensing device for sensing a mechanical contact contour of the die half, a receiving unit for receiving a label transmitted by a RFID-unit of the die half or a capturing device for capturing a label by means of an inductive coupling between the die half and the capturing device. The label of the die half might be a label of the type of the die half, a unique specific label for the die half and/or authentication of the die half. It is possible that by means of the aforementioned communication paths after the capturing of a label of a die half a list of workpieces is generated which can be crimped by the captured die half. These types of workpieces can then be displayed at a display device of the crimping pliers or on the external control unit. It is also possible that additional to the capturing of the die half by a label also the type of a workpiece is detected (e.g. on the basis of an image processing basing on a picture taken by a camera). In this case by means of the control logic of the electronic constructional unit 47 and/or the external electronic control unit it can be analyzed if the captured die half is suitable for crimping the captured type of the workpiece which can then be brought to the attention of the user optically or acoustically by the crimping pliers or by the external electronic control unit. With respect to these and further embodiments of the capturing device for capturing a label of die half and the communication of the crimping pliers with an external electronic control unit and in some cases via the external electronic control unit with a cloud storage unit and options for analyzing and determining suitable combination of die halves and workpieces reference is made to the patent publication EP 3 656 504 B1 which with respect to these aspects is incorporated by reference into the present application.

We claim:

1. A crimping pliers force sensor for crimping pliers having a pliers part, the crimping pliers force sensor comprising
    a) a transfer body comprising a contact surface for a die back of a die half,
    b) a supporting body which comprises a mounting portion for mounting the supporting body to the pliers part of the crimping pliers and
    c) at least one piezoelectric film arranged between the transfer body and the supporting body,
    d) wherein the supporting body comprises at least one protrusion having a longitudinal axis extending parallel to a crimping axis and wherein the transfer body comprises at least one recess,
    e) the at least one protrusion and the at least one recess
        ea) guiding the transfer body and the supporting body relatively to each other for a relative movement along a degree of freedom having an orientation parallel to the crimping axis and
        eb) providing a guiding force having an orientation transverse to the crimping axis.

2. The crimping pliers force sensor of claim 1, wherein the supporting body comprises at least one rod-like protrusion having an orientation parallel to the crimping axis.

3. The crimping pliers force sensor of claim 2, wherein the at least one rod-like protrusion has a rectangular cross section.

4. The crimping pliers force sensor of claim 1, wherein the transfer body is a transfer plate which comprises the at least one recess.

5. The crimping pliers force sensor of claim 4, wherein the at least one recess is a cutout defined at a corner of the transfer plate.

6. The crimping pliers force sensor of claim 1, wherein the at least one protrusion is at least one rod-like protrusion having an orientation parallel to the crimping axis, wherein the at least one rod-like protrusion has a rectangular cross section, wherein the transfer body is a transfer plate and wherein the at least one recess is a cutout defined at a corner of the transfer plate.

7. The crimping pliers force sensor of claim 1, wherein the at least one piezoelectric film comprises a film recess through which the at least one protrusion extends into the at least one recess of the supporting body.

8. The crimping pliers force sensor of claim 6, wherein the at least one piezoelectric film comprises film corner cutouts through which the protrusions of the supporting body extend into the corner cutouts of the transfer plate.

9. The crimping pliers force sensor of claim 1, wherein a flexible conducting track is positioned between the transfer body and the supporting body, and wherein the at least one piezoelectric film is arranged on the flexible conducting track.

10. The crimping pliers force sensor of claim 9, wherein the flexible conducting track comprises an electronic control unit which processes a measurement signal of the at least one piezoelectric film.

11. The crimping pliers force sensor of claim 10, wherein the electronic control unit comprises control logic which considers a specific dependency of the at least one piezoelectric film, the dependency being stored in a storage unit arranged on the flexible conducting track.

12. The crimping pliers force sensor of claim 9, wherein the flexible conducting track is connected to a connector or plug.

13. The crimping pliers force sensor of claim 9, wherein the flexible conducting track comprises a first leg and a second leg, the first leg and the second leg being connected to each other by an angled section.

14. The crimping pliers force sensor of claim 13, wherein
a) the at least one piezoelectric film, an electronic control unit and/or a storage unit are/is arranged in a region of the first leg and
b) a plug or connector is arranged in an end portion of the second leg which is arranged remote from the angled section.

15. Crimping pliers comprising
a) a crimping pliers force sensor comprising
  aa) a transfer body comprising a contact surface for a die back of a die half,
  ab) a supporting body which comprises a mounting portion for mounting the supporting body to a pliers part of the crimping pliers and
  ac) at least one piezoelectric film arranged between the transfer body and the supporting body,
  ad) wherein the supporting body comprises at least one protrusion having a longitudinal axis extending parallel to a crimping axis and the transfer body comprises at least one recess,
  ae) the at least one protrusion and the at least one recess guiding the transfer body and the supporting body relatively to each other for a relative movement along a degree of freedom having an orientation parallel to the crimping axis and providing a guiding force having an orientation transverse to the crimping axis,
b) a fixed pliers part with a fixed hand lever, the supporting body being held on the fixed pliers part,
c) a toggle lever driver which is supported on the fixed pliers part and
d) a moveable hand lever and a moveable pliers jaw which are connected to each other by a toggle lever drive.

16. The crimping pliers of claim 15, wherein
a) a flexible conducting track is positioned between the transfer body and the supporting body, and wherein the at least one piezoelectric film is arranged on the flexible conducting track,
b) the flexible conducting track comprises a first leg and a second leg, the first leg and the second leg being connected to each other by an angled section,
c) a longitudinal axis of the first leg of the conducting track extends in a longitudinal plane (y-z-plane) of the crimping pliers and
d) the second leg of the conducting track has a curved longitudinal axis, extends in a transversal plane (x-z-plane) of the crimping pliers and extends at least partially around a portion of the fixed pliers part.

17. The crimping pliers of claim 16, wherein
a) the crimping pliers comprise an electronic constructional unit,
b) the electronic constructional unit comprises two printed circuit boards,
c) the printed circuit boards are arranged on different sides of a pliers head of the crimping pliers,
d) the printed circuit boards are connected to each other by a connecting conducting track and
e) the connecting conducting track and the second leg of the conducting track extend in parallel transversal planes of the crimping pliers (x-z-planes) around the fixed pliers part.

18. The crimping pliers force sensor of claim 16, wherein the protrusions and recesses are in a plane having an orientation transverse to a crimping force.

19. The crimping pliers force sensor of claim 18, wherein the degree of freedom having an orientation parallel to the crimping axis is in the direction of biasing the piezoelectric film arranged between the transfer body and the supporting body with the crimping force.

20. A crimping pliers force sensor for crimping pliers having a pliers part, the crimping pliers force sensor comprising
a) a transfer body comprising a contact surface for a die back of a die half,
b) a supporting body which comprises a mounting portion for mounting the supporting body to the pliers part of the crimping pliers and
c) at least one piezoelectric film arranged between the transfer body and the supporting body,
d) wherein the supporting body comprises at least one recess, and wherein the transfer body comprises at least one protrusion having a longitudinal axis extending parallel to a crimping axis,
e) the at least one protrusion and the at least one recess
  ea) guiding the transfer body and the supporting body relatively to each other for a relative movement along a degree of freedom having an orientation parallel to the crimping axis and
  eb) providing a guiding force having an orientation transverse to the crimping axis.

* * * * *